US008619509B1

(12) United States Patent
Rivkin et al.

(10) Patent No.: US 8,619,509 B1
(45) Date of Patent: Dec. 31, 2013

(54) WRITE POLE DESIGN

(75) Inventors: Kirill Aleksandrovich Rivkin, Edina, MN (US); Mourad Benakli, Bloomington, MN (US); Ned Tabat, Chanhassen, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/569,408

(22) Filed: Aug. 8, 2012

(51) Int. Cl.
*G11B 11/00* (2006.01)

(52) U.S. Cl.
USPC .................................. 369/13.14; 360/125.03

(58) Field of Classification Search
USPC .......... 369/13.01, 13.02, 13.13, 13.14, 13.33; 360/59, 125.03
See application file for complete search history.

(56) References Cited

U.S. PATENT DOCUMENTS

| | | | |
|---|---|---|---|
| 5,333,086 A * | 7/1994 | Frey et al. ................. 360/125.41 |
| 6,721,138 B1 * | 4/2004 | Chen et al. ..................... 360/317 |
| 6,982,932 B2 * | 1/2006 | Sakakima et al. ......... 369/13.17 |
| 7,027,700 B2 | 4/2006 | Challener |
| 7,330,404 B2 | 2/2008 | Peng et al. |
| 7,417,824 B2 * | 8/2008 | Kameda .................... 360/125.02 |
| 7,589,936 B1 * | 9/2009 | McFadyen et al. ........ 360/123.1 |
| 7,855,853 B2 * | 12/2010 | Linville et al. ............. 360/125.3 |
| 7,864,434 B2 | 1/2011 | Peng |
| 7,885,029 B2 * | 2/2011 | Miyauchi et al. ................ 360/59 |
| 7,911,882 B2 * | 3/2011 | Shimazawa et al. ....... 369/13.33 |
| 7,965,464 B2 | 6/2011 | Batra et al. |
| 8,004,794 B2 * | 8/2011 | Zhou et al. ................ 360/125.31 |
| 8,018,679 B2 * | 9/2011 | Hsiao et al. .............. 360/125.07 |
| 8,035,922 B2 * | 10/2011 | Lille et al. ................. 360/123.06 |
| 8,233,233 B1 * | 7/2012 | Shen et al. ................ 360/125.03 |
| 8,310,901 B1 * | 11/2012 | Batra et al. ................. 369/13.33 |
| 8,320,220 B1 * | 11/2012 | Yuan et al. .................. 369/13.33 |
| 2003/0112542 A1 | 6/2003 | Rettner et al. |
| 2003/0235121 A1 | 12/2003 | Eppler |
| 2004/0001394 A1 | 1/2004 | Challener et al. |
| 2004/0001420 A1 | 1/2004 | Challener |
| 2005/0041950 A1 | 2/2005 | Rottmayer et al. |
| 2005/0052771 A1 | 3/2005 | Rausch et al. |
| 2005/0078565 A1 | 4/2005 | Peng et al. |
| 2005/0289576 A1 | 12/2005 | Challener |
| 2006/0143635 A1 | 6/2006 | Liu et al. |
| 2007/0258167 A1 | 11/2007 | Allen et al. |
| 2008/0170319 A1 | 7/2008 | Seigler et al. |
| 2009/0073858 A1 * | 3/2009 | Seigler et al. ............. 369/112.27 |
| 2009/0154019 A1 * | 6/2009 | Hsiao et al. ................. 360/234.3 |
| 2009/0251821 A1 | 10/2009 | Song et al. |
| 2010/0112486 A1 | 5/2010 | Zhang et al. |
| 2010/0123965 A1 | 5/2010 | Lee et al. |
| 2010/0214685 A1 | 8/2010 | Seigler et al. |
| 2011/0090588 A1 | 4/2011 | Gao et al. |
| 2012/0039155 A1 | 2/2012 | Peng et al. |
| 2012/0268843 A1 * | 10/2012 | Linville et al. ........... 360/125.03 |

* cited by examiner

*Primary Examiner* — Brenda Bernardi
(74) *Attorney, Agent, or Firm* — HolzerIPLaw, PC (57) ABSTRACT

In an example, a method comprises aligning a central axis of a paddle portion on a write pole circuit to be substantially perpendicular to an adjacent magnetic surface, and bending a central axis of an extended tip portion relative to the central axis of the paddle portion. In another example, a transducer head comprises a write pole circuit having a paddle portion with a central axis, and an extended tip portion with a central axis, the central axis of the extended tip portion angled from the central axis of the paddle portion. In another example, a magnetic circuit comprises a write pole circuit having a paddle portion and an extended tip portion, the extended tip portion bending away from a central axis of the paddle portion, and a coil wrapping around the extended tip portion.

20 Claims, 7 Drawing Sheets

WRITE POLE DESIGN

BACKGROUND

Heat-assisted magnetic recording (HAMR) transducer heads record data on a recording media using laser thermal assistance by converting laser light by the near field transducer to evanescent fields that are more compact and create a highly intense energy spot on the media for a write operation. The technology takes advantage of high-stability magnetic compounds that can store single bits in a small bit storage area on the magnetic storage medium without being limited by the same paramagnetic effect that limits other types of magnetic storage technology. HAMR systems apply heat to each bit storage area during a write operation to overcome the enhanced stability of the magnetic storage medium, thus allowing a magnetic write pole circuit to effect a change in magnetic polarity of the heated bit storage area without changing the polarity of nearby unheated bit storage areas. In some circumstances, a light source (such as a laser) is used to heat the bit location during a write operation. However, the presence of a waveguide for the light transfer and a near field optical transducer in the HAMR head involves complex manufacturing techniques and limits the design space available for the magnetic portion of the writer. Thus, any design changes to the write pole are generally limited in nature.

SUMMARY

Fast and efficient write pole circuit design is disclosed. A transducer head forms a magnetic circuit with a write pole circuit having a paddle portion and an extended tip portion. The extended tip portion angles away from a central axis of the paddle portion, and a coil wraps around the extended tip portion. The extended tip portion may have unequal double bevels to funnel flux density into a smaller cross section to increase flux density at an end portion of the extended tip portion. A return pole has a central axis that extends substantially perpendicular from a magnetic surface. The central axis of the return pole is substantially parallel to the central axis of the paddle portion, and the central axis of the extended tip portion is angled relative to the central axis of the return pole. Other implementations are also described and recited herein.

This Summary is provided to introduce a selection of concepts in a simplified form that are further described below in the Detailed Description. This Summary is not intended to identify key features or essential features of the claimed subject matter nor is it intended to be used to limit the scope of the claimed subject matter. Other features, details, utilities, and aspects of the claimed subject matter will be apparent from the following more particular written Detailed Description of various implementations and implementations as further illustrated in the accompanying drawings and defined in the appended claims.

BRIEF DESCRIPTIONS OF THE DRAWINGS

The described technology is understood from the following Detailed Description describing various implementations read in connection with the accompanying drawings.

DETAILED DESCRIPTION

Magnetic data storage devices include media, wherein each data bit is magnetically stored on the media. Data is stored in the individual cells along consistent bit tracks, which are typically recorded into the storage medium at concentric radial positions (e.g., from an inner diameter (ID) to an outer diameter (OD) of the storage medium). As the storage medium rotates in a storage device, a transducer head is positioned in close proximity to the storage medium surface along a data track to read data from and write data to the individual cells in the track.

Disc drives typically use an actuator for positioning the transducer head adjacent to the storage medium. A servo control system receives servo positioning information read by the transducer head from the data tracks, typically from equally-angularly-spaced servo sectors that extend generally radially across the tracks. The servo control system supplies control signals to the actuator to maintain the transducer head on track and move the transducer head to the desired tracks for reading and writing of data.

An aggressively located coil has been shown to provide a somewhat better response of the write pole circuit to overshoot, potentially allowing the write pole circuit to reach rise time in the upper 500 pico seconds (ps) range, at the expense of substantial optimization of operating current around very high levels. But the write pole circuit (e.g., having a total pole length or TPL of about 400 nanometers (nm), and a total pole width trailing or TPWT of about 200 nm) does not saturate well at small currents, especially without a soft under layer (SUL). The field that is produced has a large angle, which is beneficial for Stoner-Wolfarth recording significantly below Currie Temperature (Tc) (temperature of the media). However, because it is difficult to minimize the HAMR write width below about 60 nm, a significant boost of down-track effective gradient is needed (as compared to conventional perpendicular products) to establish a high linear density capability. This requires generating a well-controlled perpendicular magnetic field, with a fast rise time (<200 ps).

The transducer head disclosed herein forms a magnetic circuit, and the write pole circuit may be designed with a paddle portion and an extended tip portion. The extended tip portion bends away from a central axis of the paddle portion, and a coil wraps around the extended tip portion (see, e.g., FIGS. 2c and 3 described below). The central axis of the return pole is substantially parallel to the central axis of the paddle portion, and the central axis of the extended tip portion is angled relative to the central axis of the return pole. The write pole circuit design significantly boosts both transitional and steady-state performance. In addition, the write pole bevel and compact coils may be adapted to be compatible with optical specifications of HAMR transducer heads. The write pole circuit design improves write field rise time, provides better consistency of the produced write field, and increases the magnitude of the perpendicular field during write operations.

Figure 1:
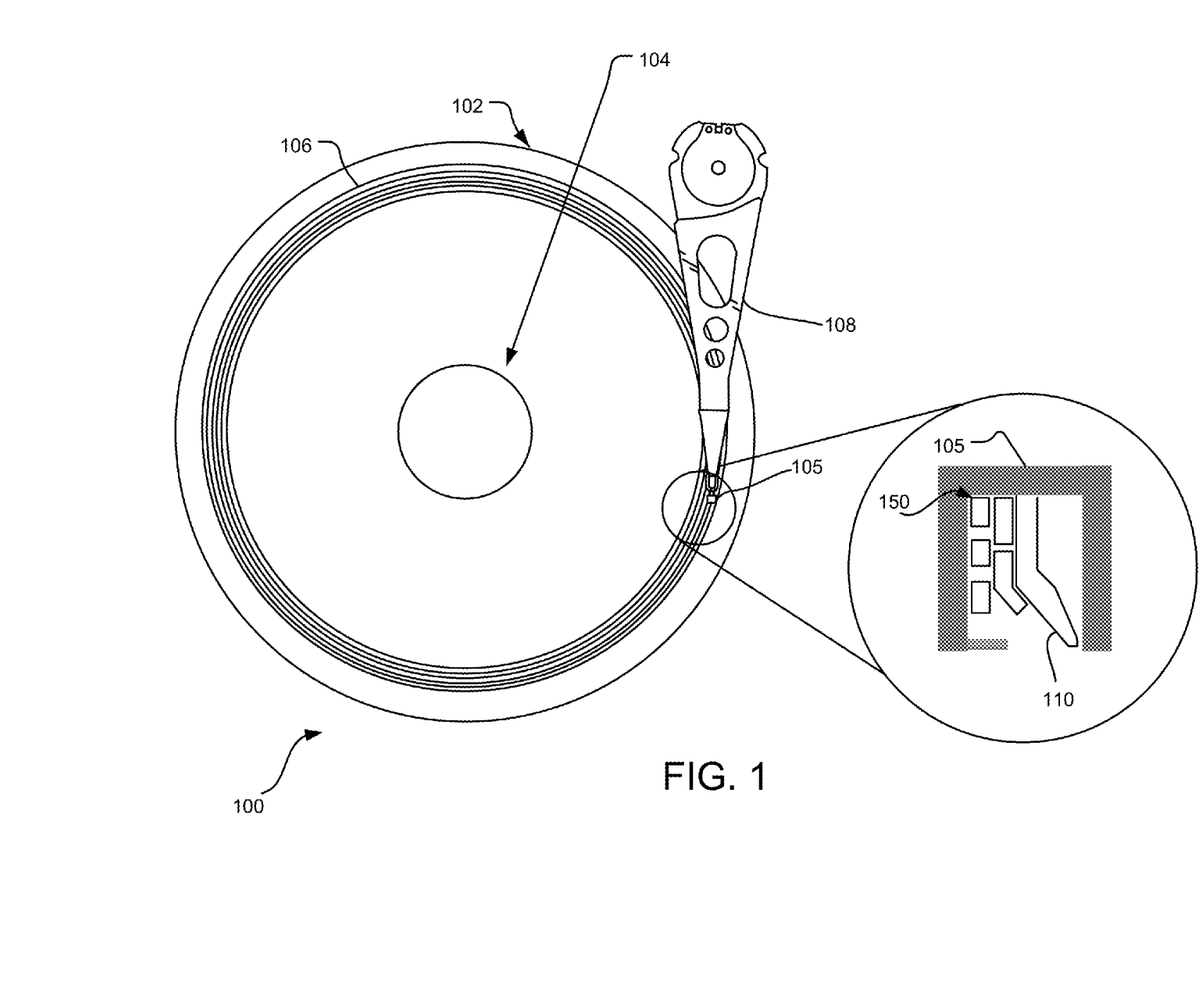
FIG. 1 illustrates a plan view of an example implementation of a magnetic storage disc with a transducer head situated on an end of an actuator assembly.

FIG. 1 illustrates a plan view of an example implementation of a disc 100 with a transducer head 110 situated on an end of an actuator assembly 108. Disc 100 includes an outer diameter 102 and inner diameter 104 between which are a number of concentric tracks 106, illustrated by circular dashed lines. Tracks 106 are substantially circular and are regularly spaced, indicated as ovals in the track 106 as illustrated on disc 100. The disc 100 rotates about a disc axis of rotation during operation.

Information is written to and read from the tracks on the disc 100 in different tracks 106. The transducer head 110 (as can also be seen in the exploded view in FIG. 1) is mounted on the actuator assembly 108 at an end distal to the actuator assembly 108 axis of rotation, and flies in close proximity above the surface of the disc 100 during disc operation. The actuator assembly 108 rotates during a seek operation about the actuator assembly 108 axis of rotation positioned adjacent to the disc 100. The seek operation positions the transducer head 105 over a target track.

The transducer head 105 is designed with a compact core. Compact cores demonstrate performance benefits in response to a reduced write field rise time (that is, how fast the writer pole responds to a change in direction of the coil field). Main transducer head coils may be implemented close to the airbearing surface (ABS) of the magnetic storage medium 100 for the purpose of reducing the write field rise time. The write field is determined mostly by a write pole 110. In an implementation, a write pole 110 includes an extended tip portion that bends, and coils 114 that wrap around the extended tip portion.

In an example, the transducer head 105 includes coils 150 provided inside the write structure and which wrap around the extended tip portion of the write pole 110. To accommodate compact coils close to the ABS and write pole, and reduce the complications of geometry, the core disclosed herein (i.e., the write pole 110) is located next to the waveguide cladding and the coils are between the reader shields and the write pole.

Figure 2A:
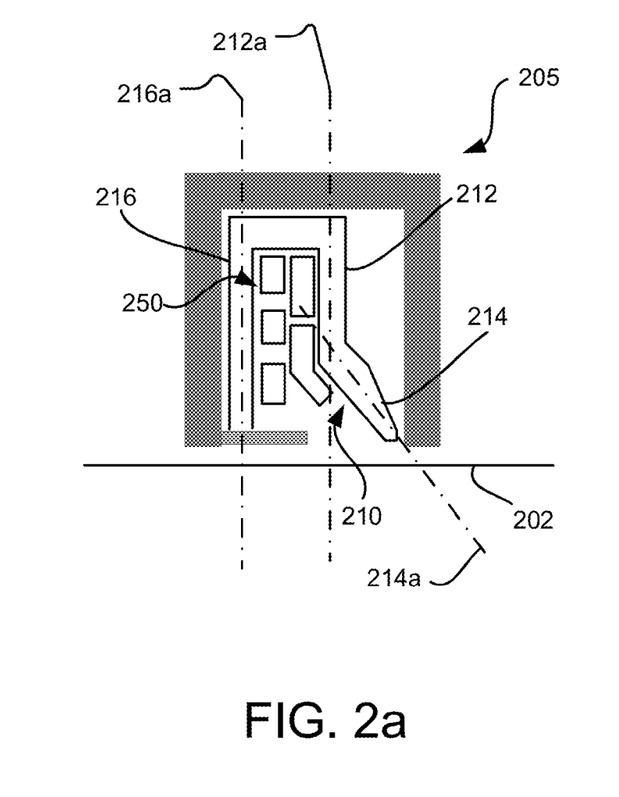
FIG. 2a illustrates a simplified side view of an example transducer head, wherein a write pole circuit according to the present design is visible.
Figure 2B:
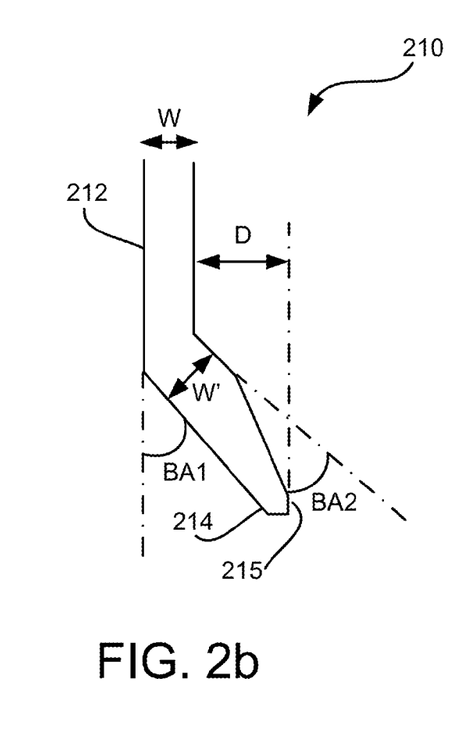
FIG. 2b illustrates a side view of an example write pole circuit design.
Figure 2C:
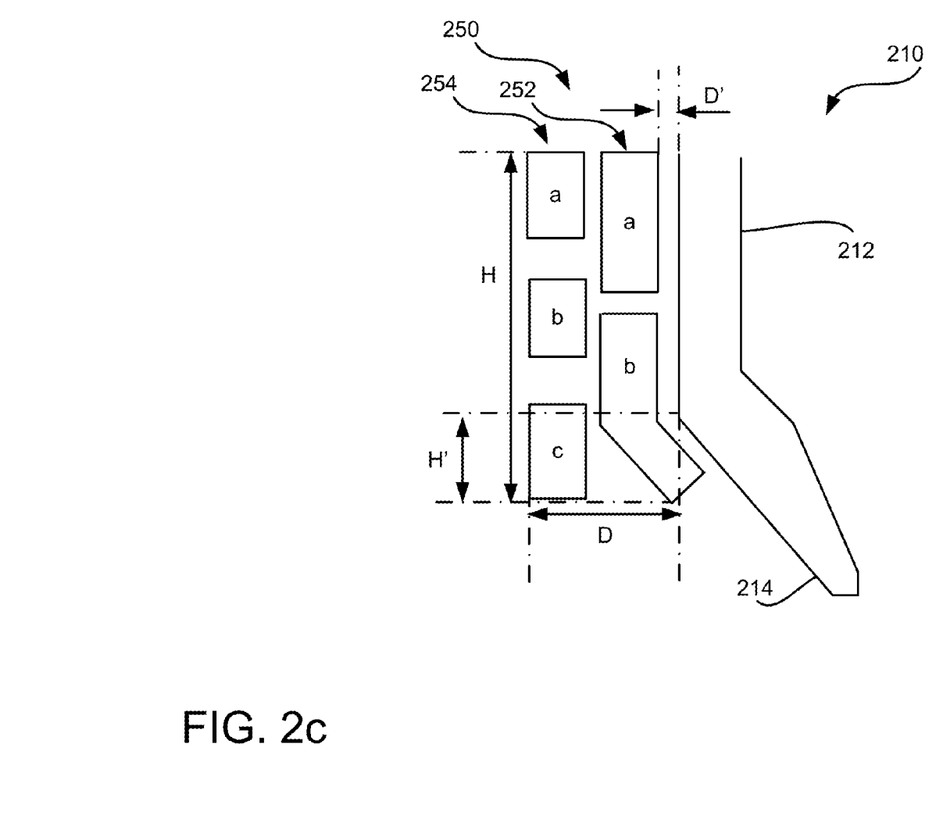
FIG. 2c illustrates another side view of an example transducer head showing an example coil design.
Figure 3A:
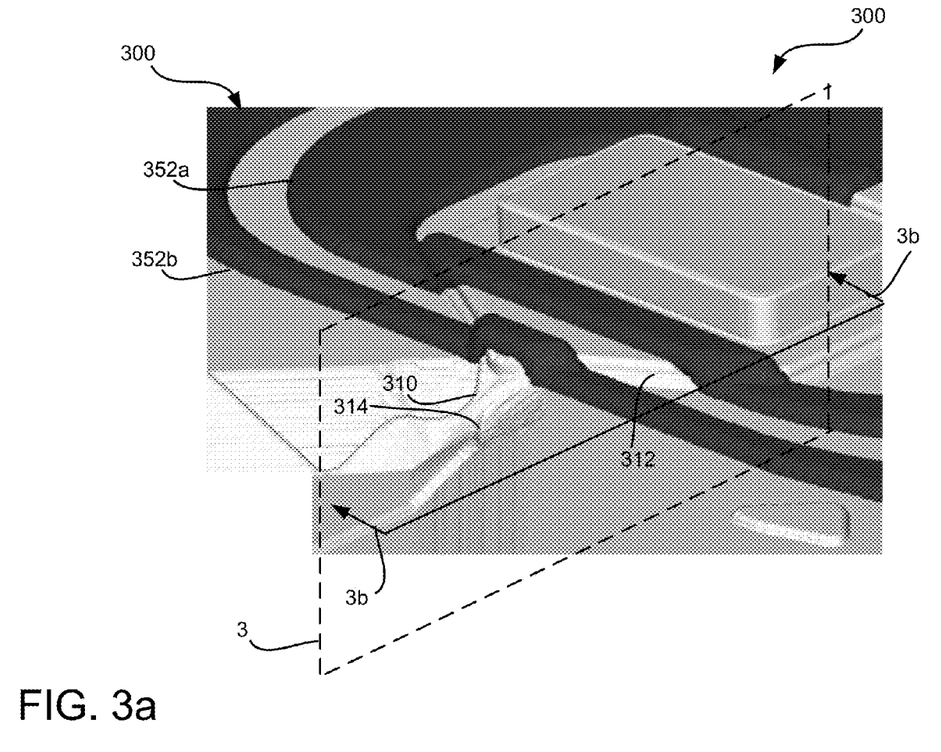
FIG. 3a illustrates a perspective view of an example transducer head showing a first coil layer deposited during a manufacture process.
Figure 3B:
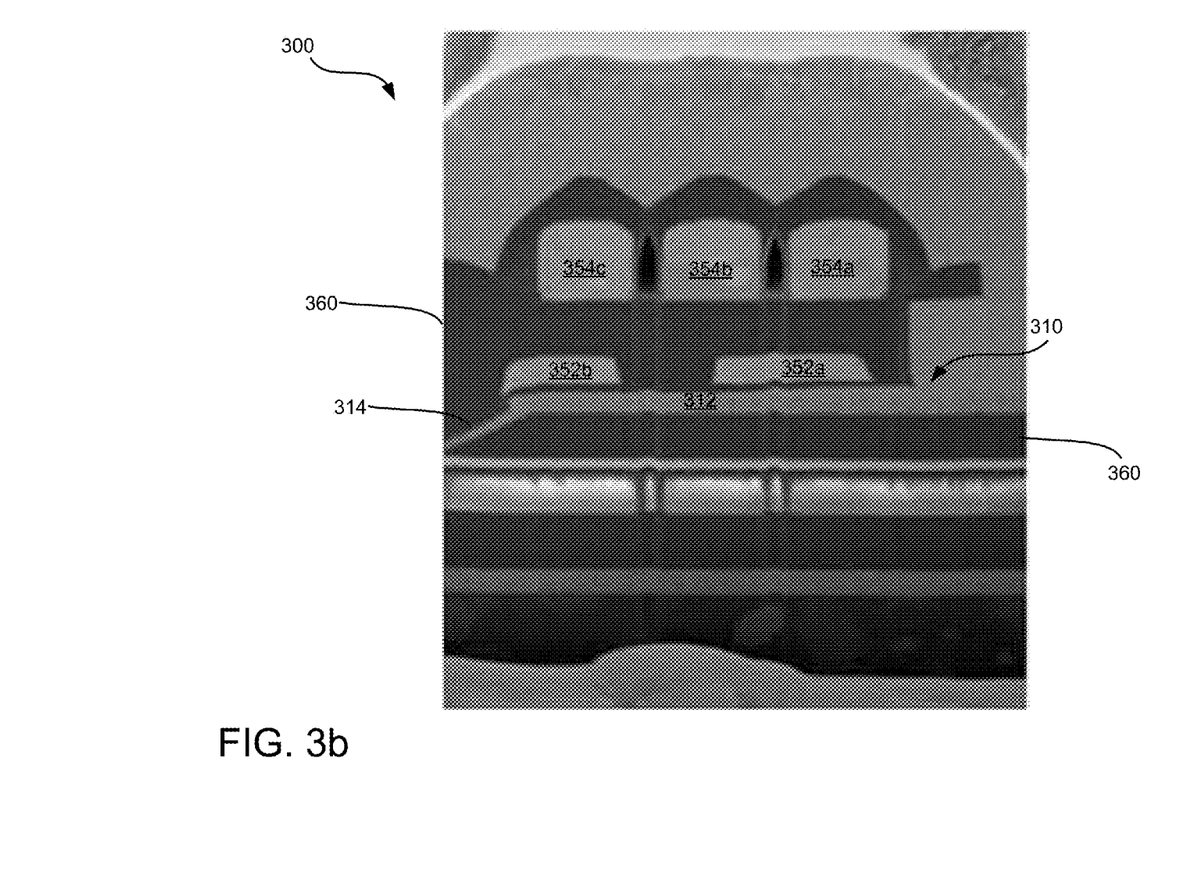
FIG. 3b illustrates a cutaway side view of the example transducer head taken through plane 3 in FIG. 3a as viewed in the direction of lines 3b-3b, showing the write pole circuit and first and second coil layers.

The write pole 110 and coils 114 can be better seen in the views shown in FIGS. 2a-c. FIG. 2a illustrates a simplified side view of an example transducer head 205 shown adjacent ABS 202, wherein a write pole 210 according to the present design is visible. The transducer head 205 is shown with the actuator assembly (FIG. 1) omitted.

In an implementation, the write pole 210 includes a paddle portion 212 and an extended tip portion 214. The extended tip portion 214 bends away from a central axis 212a of the paddle portion 212, and coils 250 wrap around the extended tip portion 214. A return pole portion 216 is also shown having a central axis 216a. The central axis 216a of the return pole portion 216 is substantially parallel to the central axis 212a of the paddle portion 212, and a central axis 214a of the extended tip portion 214 is angled relative to the central axis 216a of the return pole portion 216.

FIG. 2b illustrates a side view of an example write pole 210 design. In an implementation, the write pole 210 may have a paddle portion 212 with a width W of about 320 nm. The write pole 210 also has an extended tip portion 214 having a width W' where the extended tip portion 214 meets the lower portion of the paddle portion 212. The extended tip portion 214 is also beveled. A first bevel angle BA1 is about 40-50° and a second bevel angle BA2 is about 60°. The bevel angles cause the lower portion of the extended tip portion 214 to be a distance D of about 600-800 nm from the paddle portion 212. It is noted, however, that the distance D is based at least to some extent on optical considerations. The lower portion of the extended tip portion 214 forms a TPH of about 70-150 nm, and a TPL of about 130-200 nm.

The design shown in FIG. 2b offers a significant reduction of TPL to enhance the pole tip saturation, without large sacrifices in the perpendicular field. The design also includes a second facet 215, which is perpendicular to the ABS, with a top pole height TPH of about 70-200 nm. This second facet 215 significantly boosts the perpendicular field at the leading edge, and reduces sensitivity to the bevel angles (BA1 and BA2). Using unequal bevel angles (BA1 and BA2) also provides a substantial boost to the write field for low overall beveling angles, which helps improve the optical efficiency.

It is noted that the design shown in FIG. 2b is based on modeling and analytical analysis, but is not intended to be limiting. For example, the TPL and TPH parameters may be adjusted to help ensure generation of the desired amount of field in a saturated state (which corresponds to reliable field values and rise time), with moderate current levels in the coils. Modeling shows that fields as high as 10 kOe (kilo-Oersted), a measure of magnetic flux, can be reliably generated at the transition.

FIG. 2c illustrates another side view of an example transducer head showing an example coil design 250. The coil design 250 is provided in any suitable position in the transducer head to achieve the desired result. In an implementation, the coil design 250 extends a distance D of about 1 μm from the write pole 210. The coil design may be positioned apart from the write pole at a distance D' of about 200-300 nm. The coil design 250 is shown having an overall height H of about 1.7 μm. The coil design 250 may extend for a height H' of about 100-200 nm below the lower most portion of the paddle portion 212.

The coil design 250 is shown having two layers of coils. In an implementation, the coil design 250 has a first layer of coils 252 including coils 252a and 252b and a second layer 254 including coils 254a-c. In the first coil layer 252, the lower coil 252b is shown as it may wrap around the bend formed at the junction of the paddle portion 212 and the extended tip portion 214. The second coil layer 254 may include three coils 254a-c.

The materials used to manufacture the coils may include any of a wide variety of conventional electrical conductors, including but not limited to metals such as Cu, Au, Al, W, and Mo. Other non-metal materials may also be used, such as carbon nanotubes. The material may also be selected to have a small coefficient of thermal expansion so that the size can be contained even when heat is generated by the current flowing through the coil design 250.

The conductivities and materials used to manufacture the coil design 250 may be engineered according to the desired result. For example, different substances can be used to generate the desired conductivity and current density to produce a magnetic field adjacent the write pole 210 for write operations. The coils are energized using a relatively small current flowing through the main transducer head. The coils are energized using any suitable source.

FIG. 3a illustrates a perspective view of an example transducer head showing a first coil layer deposited during a manufacture process. FIG. 3b illustrates a cutaway side view of the example transducer head taken through plane 3 in FIG. 3a as viewed in the direction of lines 3b-3b, showing the write pole and first and second coil layers.

The transducer head 300 is shown with write pole 310 including a paddle portion 312 and an extended tip portion 314. The extended tip portion 314 bends away from a central axis of the paddle portion 312. In the example shown, a coil design 350 is oriented in a cross-track direction in proximity to (e.g., embedded in) the transducer head 300, and in a down track direction from the write pole 314.

A first coil layer 352 is shown with two coils 352a and 352b. Coil 352 is shown in FIGS. 3a-b as it may wrap around the extended tip portion 314. Although not visible in FIG. 3a, the coil design 350 has two layers of coils. In an implementation, the coil design 350 has a second layer 354 including coils 354a-c. Spacer material 360 is also visible in the cross-section shown in FIG. 3b.

Figure 4:
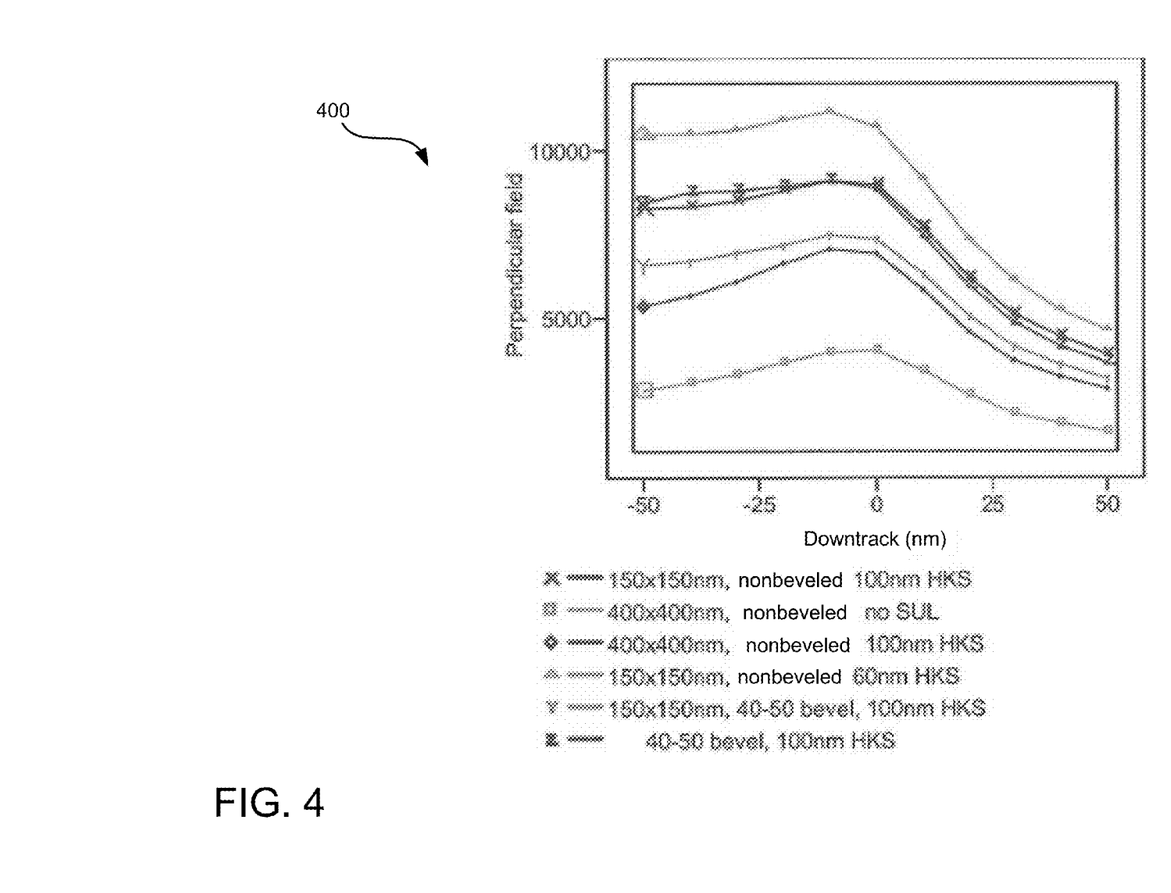
FIG. 4 is a plot showing write head performance for non-beveled write heads and an example beveled write head manufactured according to the disclosure here.

FIG. 4 is a plot 400 showing write head performance for non-beveled write heads and an example beveled write head manufactured according to the present disclosure. The task of reducing the rise time is surprisingly complex. The simplest solution is to extend the beveled section and position compact coils on each side. But this is impractical in a HAMR write head (e.g., due to size and configuration restrictions). Instead, the condensed coil design described herein demonstrates performance consistent with 200 ps guidelines and does not exhibit long slow field saturation (i.e., a large difference between points in time when magnetization dynamics around the bending point). It can be seen from the plot (y and z lines) that the beveled designs demonstrates low sensitivity to overshoot (Sonora-class behavior) due to fast and efficient saturation of the rise time.

Figure 5:
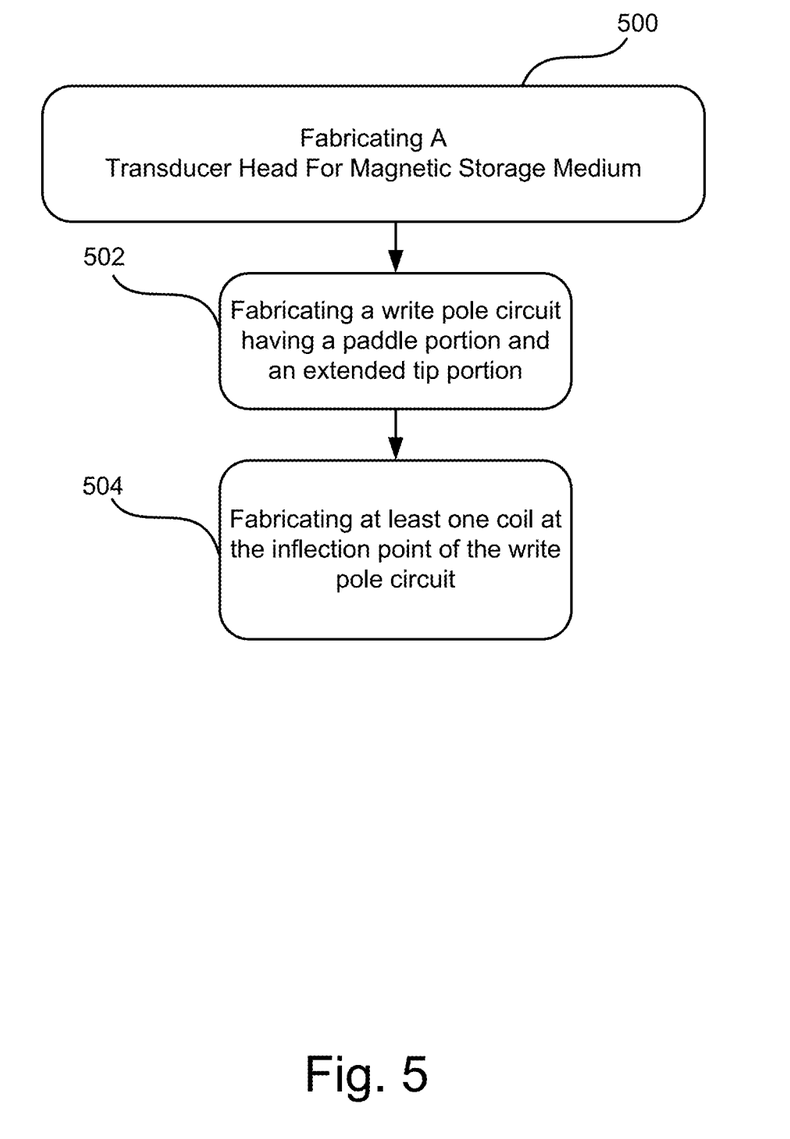
FIG. 5 illustrates a flow chart illustrating example operations for manufacturing a transducer head with fast and efficient write pole circuit design.

FIG. 5 illustrates a flow chart illustrating example operations 500 for manufacturing a transducer head with the fast and efficient write pole described herein.

In an assembly operation, a transducer head is fabricated. The transducer head is fabricated in a thin film process that creates the write pole and its components, the air bearing surface, the coils, a shield, etc. The transducer head is fabricated during multiple layer-based fabrication operations, in the direction from extended tip portion to return pole portion.

In an example, operation 502 includes fabricating a write pole circuit having a paddle portion and an extended tip portion. A central axis of the paddle portion is substantially perpendicular to an air-bearing surface of the transducer head. A central axis of an extended tip portion is angled relative to the central axis of the paddle portion.

In addition, the extended tip portion may be beveled. The bevel angle may be selected to cause the lower portion of the extended tip portion to be a distance of about 600-800 nm from the paddle portion. In an example, a first bevel angle is about 40-50° and a second bevel angle is about 60°. The lower portion of the extended tip portion forms a TPH of about 70-150 nm, and a TPL of about 130-200 nm. Such a design significantly reduces TPL to enhance the pole tip saturation, without large sacrifices in the perpendicular field.

The design also includes a second facet, which is perpendicular to the ABS, with a top pole height TPH of about 70-200 nm. This second facet significantly boosts the perpendicular at the leading edge, and reduces sensitivity to the bevel angles. Using unequal bevel angles provides a substantial boost to the write field for low overall beveling angles, which may also improve the optical efficiency.

Operation 504 includes fabricating at least one coil at the inflection point of the write pole circuit. The coil wraps at least partially around a portion of the paddle portion and a portion of the extended tip portion. at least one coil is provided.

The coil may be provided in any suitable position in the transducer head to achieve the desired result. For example, the at least one coil may extend about 1 µm from the write pole and be positioned apart from the write pole at about 200-300 nm. The coil may have an overall height of about 1.7 µm. The coil may extend about 100-200 nm below the lower most portion of the paddle portion.

In an example, the transducer head may have at least two layers of coils. That is, a first layer of coils may include a lower coil wrapped around the bend formed at the junction of the paddle portion and the extended tip portion. A second coil layer may include three coils.

Implementations described above for manufacturing a write pole provide high-efficiency write operations. The high flux density from the coil wire magnetizes the write pole. The field profile from the coil maps to the write pole to yield enhanced write field gradients that exceed the capability of current technology, and the design can be readily fabricated and manufactured using common, low complexity materials and processing techniques.

While the exemplary implementations herein are applied to magnetic media, it should be understood that they are also applicable to other types of media, such as patterned media, and their respective methods of recording.

The above specification, examples and data provide a complete description of the structures of exemplary implementations of methods and apparatus that may be used to synchronize a magnetic response of a write pole and shield. Although various implementations of the apparatus have been described above with a certain degree of particularity, or with reference to one or more individual implementations, those skilled in the art could make numerous alterations to the disclosed implementations without departing from the spirit or scope of this invention. It is intended that all matter contained in the above description and shown in the accompanying drawings shall be interpreted as illustrative only of particular implementations and not limiting. Changes in detail or structure may be made without departing from the basic elements of the invention as defined in the following claims.

What is claimed is:

1. A method, comprising:
    fabricating a write pole circuit having a paddle portion, an extended tip portion, and a bend formed at a junction of the paddle portion and the extended tip portion; and
    fabricating at least one coil wrapping at least partially around the bend of the write pole.

2. The method of claim 1 wherein the write pole circuit further includes a return pole portion and the extended tip portion is fabricated to angle away from the return pole portion at an inflection point between the paddle portion and the extended tip portion.

3. The method of claim 1 wherein an inflection point is formed at a location in the write pole circuit at which a central axis of the extended tip portion of the write pole circuit is angled relative to a central axis of the paddle portion of the write pole circuit, a return pole on a side of the write pole opposite to reader shields to avoid interference with an optical path.

4. The method of claim 1 wherein a central axis of the paddle portion is configured to be substantially perpendicular to an air bearing surface of a transducer head.

5. The method of claim 1 wherein a central axis of a return pole portion is configured to be substantially perpendicular to an air bearing surface of a transducer head.

6. The method of claim 1 wherein the coil is configured to enhance magnetic flux emission in the write pole circuit at an inflection point between the paddle portion and the extended tip portion of the write pole circuit.

7. The method of claim 1 wherein the operation of fabricating the coil further comprises:
fabricating at least two layers of coils between a return pole portion and the paddle portion.

8. The method of claim 1 wherein the coil is wrapped at least partially around a portion of the paddle portion and a portion of the extended tip portion in an angle greater than thirty degrees relative to a central axis of the portion of the paddle portion and to a central axis of the portion of the extended tip portion, respectively.

9. A transducer head comprising:
a write pole circuit having a paddle portion, an extended tip portion, and a bend formed at a junction of the paddle portion and the extended tip portion; and
a first coil wrapping at least partially around the bend of the write pole.

10. The transducer head of claim 9 wherein an inflection point is formed at a location in the write pole circuit at which a central axis of the extended tip portion of the write pole circuit is angled relative to a central axis of the paddle portion of the write pole circuit.

11. The transducer head of claim 9 wherein the write pole circuit further includes a return pole portion and the extended tip portion is angled away from a central axis of the return pole portion.

12. The transducer head of claim 9 wherein the first coil is wrapped at least partially around the bend of the write pole in an angle greater than thirty degrees relative to a central axis of a portion of the paddle portion and to a central axis of a portion of the extended tip portion, respectively.

13. The transducer head of claim 9 wherein an inflection point constrains magnetic flux emission in the write pole circuit, and the first coil is configured to enhance magnetic flux emission at the inflection point to compensate for the constrained magnetic flux emission at the inflection point.

14. The transducer head of claim 9 wherein the write pole circuit further includes a return pole portion and the transducer head further comprises:
a second coil fabricated between the first coil and the return pole portion.

15. The transducer head of claim 9 wherein the extended tip portion has a first bevel fabricated at a different angle relative to a central axis of the extended tip portion than a second bevel, a return pole on a side of the write pole opposite to reader shields to avoid interference with an optical path.

16. The transducer head of claim 9 further comprising:
a return pole portion of the write pole circuit having a central axis extending substantially perpendicular to an air bearing surface of the transducer head, a central axis of a return pole portion being substantially parallel to a central axis of the paddle portion.

17. A magnetic circuit comprising:
a write pole circuit having a return pole portion, a paddle portion, an extended tip portion angling away from the return pole portion, and a bend formed by the paddle portion and the extended tip portion; and
a coil wrapped at least partially around the bend of the write pole.

18. The magnetic circuit of claim 17 wherein the extended tip portion has at least two unequal bevels at an end of the extended tip portion to funnel flux density into a smaller cross section of the write pole circuit to increase flux density at the end of the extended tip portion.

19. The magnetic circuit of claim 17 wherein the return pole portion has a central axis extending substantially perpendicular to an air bearing surface of a transducer head, a central axis of the return pole portion being substantially parallel to a central axis of the paddle portion, the return pole portion on a side of the write pole opposite to reader shields to avoid interference with an optical path.

20. The magnetic circuit of claim 17 further comprising:
the return pole portion having a central axis extending substantially perpendicular an air bearing surface of a transducer head, the return pole on a side of the write pole circuit opposite to reader shields to avoid interference with an optical path.

* * * * *